(12) United States Patent
Marsolek et al.

(10) Patent No.: US 12,516,507 B2
(45) Date of Patent: Jan. 6, 2026

(54) WORKSITE CONDITION ASSESSMENT USING SENSORS OF A WORK MACHINE

(71) Applicant: Caterpillar Paving Products Inc., Brooklyn Park, MN (US)

(72) Inventors: John Lee Marsolek, Watertown, MN (US); Elizabeth R. K. Brockman, Charlotte, NC (US); Nathaniel Doy, Maple Grove, MN (US); Derek K. Huhn, Monticello, MN (US); Shannon Gailene Dudley, Edina, MN (US); David Edwin Gerding, Brooklyn Park, MN (US)

(73) Assignee: Caterpillar Paving Products Inc., Brooklyn Park, MN (US)

( * ) Notice: Subject to any disclaimer, the term of this patent is extended or adjusted under 35 U.S.C. 154(b) by 191 days.

(21) Appl. No.: 18/446,966

(22) Filed: Aug. 9, 2023

(65) Prior Publication Data
US 2025/0052038 A1 Feb. 13, 2025

(51) Int. Cl.
*E02F 9/26* (2006.01)
*E02D 3/02* (2006.01)

(52) U.S. Cl.
CPC .............. *E02F 9/262* (2013.01); *E02F 9/265* (2013.01); *E02D 3/02* (2013.01)

(58) Field of Classification Search
CPC ........... E02F 9/262; E02F 9/265; E02F 9/261; E02D 3/02
See application file for complete search history.

(56) References Cited

U.S. PATENT DOCUMENTS

| | | | |
|---|---|---|---|
| 9,322,148 B2 | 4/2016 | Stratton et al. | |
| 10,324,433 B2 * | 6/2019 | Sprock | G05B 19/00 |
| 11,501,619 B2 | 11/2022 | Cherney et al. | |
| 2020/0369290 A1 | 11/2020 | Cherney | |
| 2021/0079628 A1 * | 3/2021 | Wiethorn | E02F 9/267 |
| 2022/0242452 A1 * | 8/2022 | Oboril | B60W 60/0016 |
| 2023/0008338 A1 * | 1/2023 | Ogawa | E02F 9/24 |
| 2023/0287658 A1 * | 9/2023 | Fontana | E02D 7/22 |
| 2024/0185717 A1 * | 6/2024 | Wendt | B62J 11/04 |

FOREIGN PATENT DOCUMENTS

| | | | |
|---|---|---|---|
| AU | 2014274649 B2 | 8/2012 | |
| JP | 5064976 B2 | 10/2012 | |

* cited by examiner

*Primary Examiner* — Kyle J Kingsland

(57) ABSTRACT

A controller may monitor sensor data collected by one or more sensors of a machine while the machine is operating at a worksite. The controller may determine whether the sensor data is indicative of the machine operating in an unsafe condition at a location of the machine at the worksite. The controller may cause, based on a determination that the sensor data is indicative of the machine operating in the unsafe condition, at least one of: storing of the sensor data relating to the machine operating in the unsafe condition at least until the sensor data relating to the machine operating in the unsafe condition is offboarded from the machine, or transmission of the sensor data relating to the machine operating in the unsafe condition offboard the machine.

20 Claims, 3 Drawing Sheets

WORKSITE CONDITION ASSESSMENT USING SENSORS OF A WORK MACHINE

TECHNICAL FIELD

The present disclosure relates generally to work machines and, for example, to worksite condition assessment using sensors of a work machine.

BACKGROUND

Machines can perform a variety of tasks to work a ground surface to construct, for example, a roadway, a highway, a parking lot, a foundation on which structures can be built, or the like. At a worksite, the machines may operate on a variety of terrain having various elevational changes, slopes, and types of ground. Furthermore, characteristics of the terrain may change over time as work progresses. Due to the variable properties of the terrain, some areas of the worksite may be in a condition that is unsafe, or presents safety challenges, for machine operation. For example, while operating on a side slope, a machine may be susceptible to tipping over.

U.S. Patent Application Publication No. 20200369290 (the '290 publication) relates to configuring worksite warning zones. The '290 publication discloses detecting and classifying object obstructions located at a worksite, associating position data with the object obstructions, generating object models of the object obstructions based on the associated position data, and generating and associating warning zones with the object models for display on a user display. However, the warning zones of the '290 publication do not identify unsafe conditions at a worksite (other than object obstructions), such as uneven terrain, soft underfooting, excessive grade, and/or muddy areas. Moreover, merely displaying warning zones on the user display may inadequately address unsafe conditions.

The control system of the present disclosure solves one or more of the problems set forth above and/or other problems in the art.

SUMMARY

A control system for a machine may include one or more sensors and a controller communicatively coupled with the one or more sensors. The controller may be configured to monitor sensor data collected by the one or more sensors while the machine is operating at a worksite. The controller may be configured to determine whether the sensor data is indicative of the machine operating in an unsafe condition at a location of the machine at the worksite. The controller may be configured to cause, based on a determination that the sensor data is indicative of the machine operating in the unsafe condition, at least one of: storing of the sensor data relating to the machine operating in the unsafe condition at least until the sensor data relating to the machine operating in the unsafe condition is offboarded from the machine, or transmission of the sensor data relating to the machine operating in the unsafe condition offboard the machine.

A method may include monitoring, by a controller, sensor data collected by one or more sensors of a machine while the machine is operating at a worksite. The method may include determining, by the controller, whether the sensor data is indicative of the machine operating in an unsafe condition at a location of the machine at the worksite. The method may include causing, by the controller, based on a determination that the sensor data is indicative of the machine operating in the unsafe condition, storing of the sensor data relating to the machine operating in the unsafe condition. The method may include causing, by the controller, transmission of the sensor data relating to the machine operating in the unsafe condition to a remote supervisory system or to an additional machine operating at the worksite.

A machine may include a frame, one or more ground-engaging members supporting the frame, and a controller supported by the frame. The controller configured to monitor sensor data collected by one or more sensors of the machine while the machine is operating at a worksite. The controller configured to cause, based on the sensor data being indicative of the machine operating in an unsafe condition at a location of the machine at the worksite, at least one of: storing of the sensor data relating to the machine operating in the unsafe condition at least until the sensor data relating to the machine operating in the unsafe condition is offboarded from the machine, or transmission of the sensor data relating to the machine operating in the unsafe condition offboard the machine.

DETAILED DESCRIPTION

Figure 1:
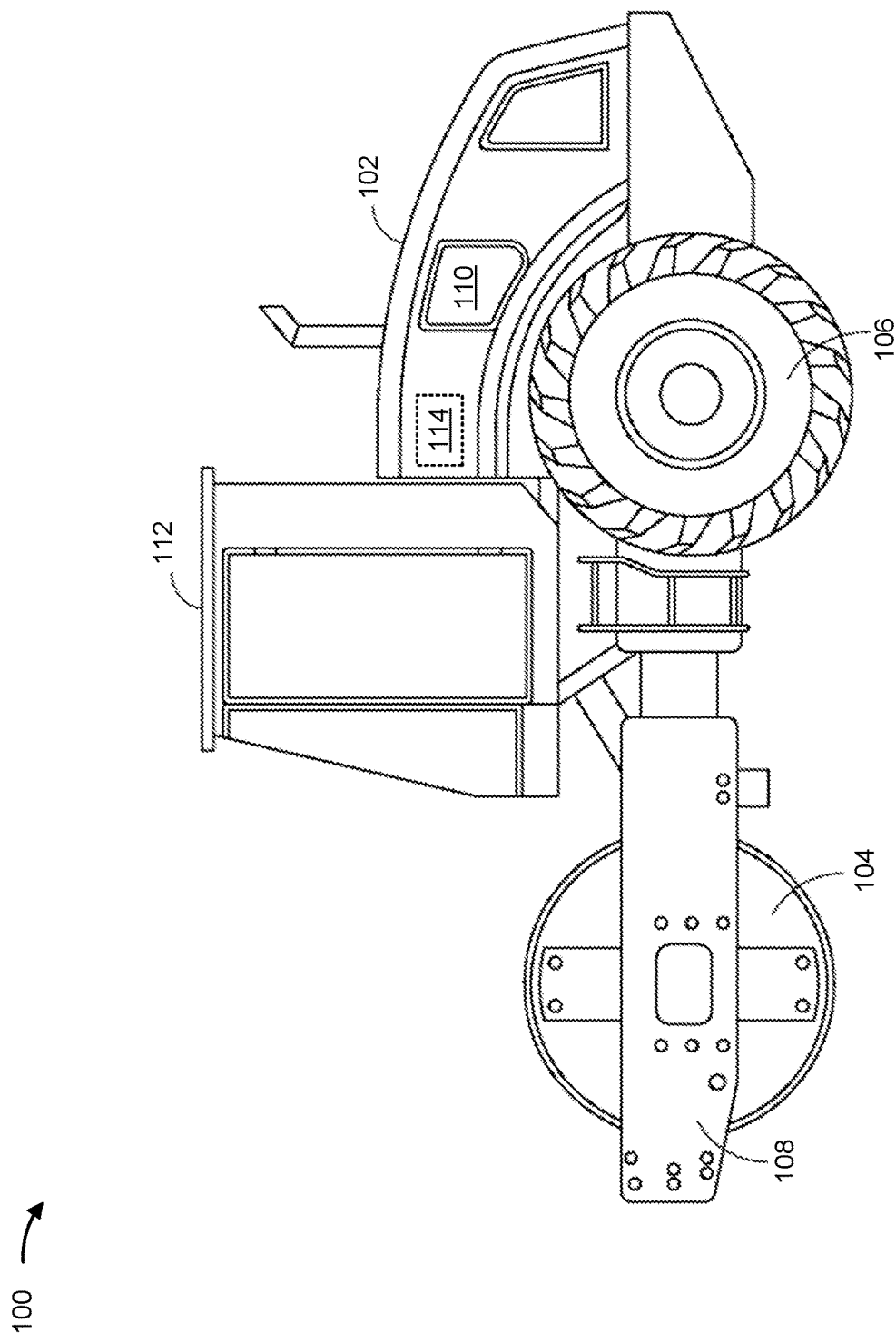
FIG. 1 shows a side elevational view of an example machine.

FIG. 1 shows a side elevational view of an example machine 100. While in FIG. 1 the machine 100 is depicted as a soil compactor machine, the machine 100 may be another type of machine, such as a dozer, a motor grader, an excavator, or the like.

The machine 100 includes a frame 102 that is supported on ground-engaging members of the machine 100. The ground-engaging members of the machine 100 may include a cylindrical roller drum 104 and one or more wheels 106 (only a single wheel 106 is shown in FIG. 1). The drum 104 is rotatable about a drum axis oriented generally transverse to a direction of travel of the machine 100. The drum 104 may be attached to the frame 102 using a drum support 108. In this example, the machine 100 may articulate such that a back section of the machine 100, including the wheel(s) 106, can articulate relative to a front section of the machine 100 that includes the drum 104.

The frame 102 supports a prime mover 110. The prime mover 110 may include an engine (e.g., an internal combustion engine), such as a diesel engine, a gasoline engine, or a gaseous fuel engine, among other examples. Additionally, or alternatively, the prime mover 110 may include an electric motor (e.g., for electric powering of the machine 100 or hybrid powering of the machine 100 with the engine) that is coupled to an electrical power storage device (e.g., a battery). The prime mover 110 is configured to provide power to the drum 104 and/or the wheel(s) 106. Furthermore, the prime mover 110 may be configured to provide power to an implement (not shown) of the machine 100, such as a blade.

An operator station 112 may be supported on the frame 102. The operator station 112 may include one or more displays and/or one or more operator controls (e.g., one or more joysticks, one or more steering wheels, and/or one or more pedals, among other examples) to operate and/or drive the machine 100. The machine 100 includes a controller 114, attached directly or indirectly to the frame 102, for electrically controlling various aspects of the machine 100. For example, the controller 114 may send and receive signals with various components of the machine 100 during the operation of the machine 100.

In some implementations, the machine 100 may be remotely controllable by an operator located off board the machine 100 via a remote control device. Based on inputs provided to the remote control device, the remote control device may transmit (e.g., wirelessly, as radio signals) commands to the controller 114, and the controller 114 may interpret the commands and cause the machine 100 to operate in accordance with the commands. In some implementations, the controller 114 may be configured to provide autonomous control of the machine 100 or autonomous control of one or more functions of the machine 100 (e.g., propulsion, braking, steering, or the like).

As indicated above, FIG. 1 is provided as an example. Other examples may differ from what is described in connection with FIG. 1.

Figure 2:
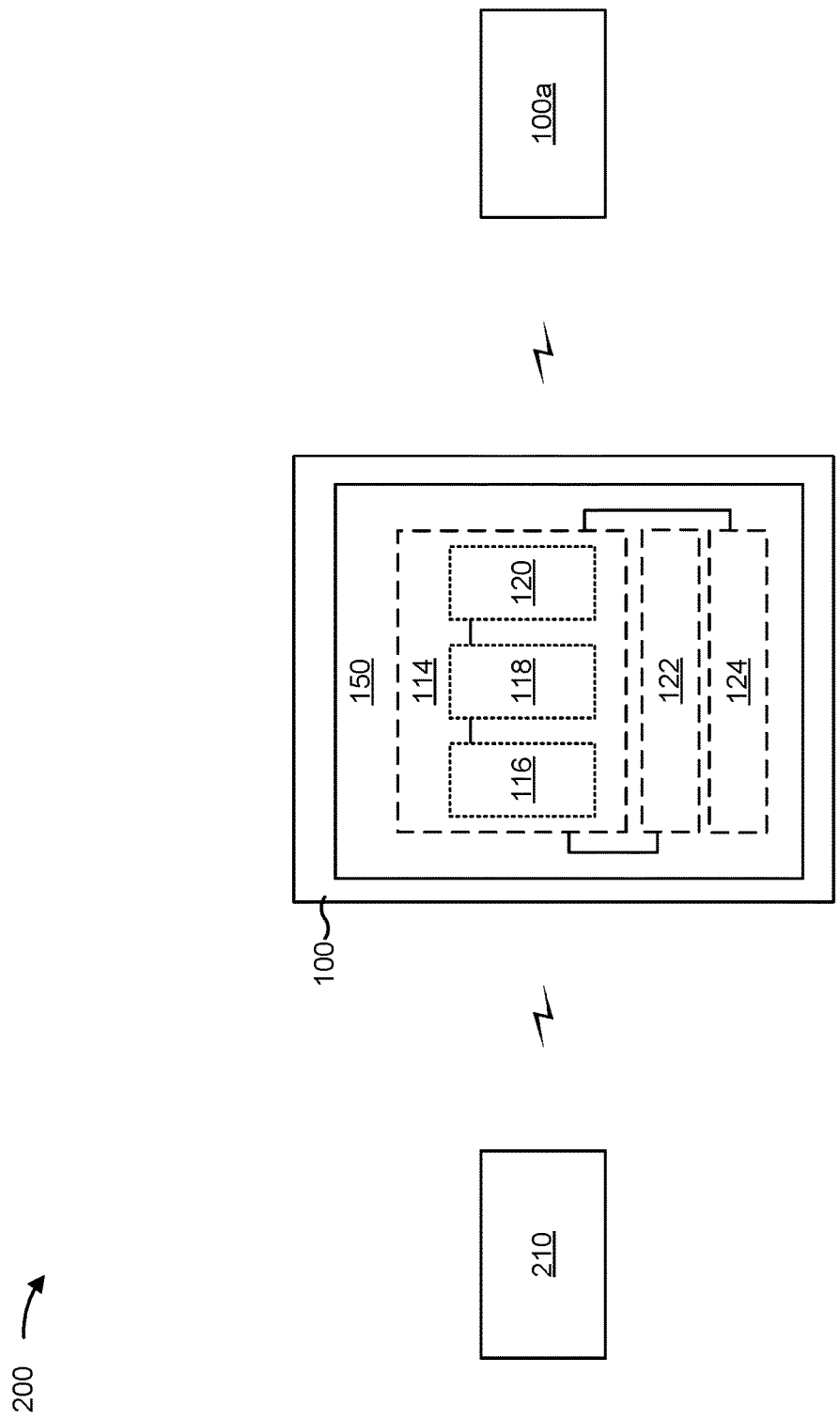
FIG. 2 is a diagram illustrating an example worksite system.

FIG. 2 is a diagram illustrating an example worksite system 200. As shown, the worksite system 200 includes the machine 100, one or more additional machines 100a, and a supervisory system 210. The worksite system 200 may be associated with a worksite where the machine 100 and the additional machine(s) 100a may perform work to condition a ground surface. For example, the machine 100 and the additional machine(s) 100a may perform one or more operations associated with base layer preparation, including shaping, grading, and/or compacting a base layer (e.g., a soil layer).

The additional machine(s) 100a may include one or more machines that are the same make, model, and/or type as the machine 100, and/or one or more machines that are a different make, model, and/or type from the machine 100. One or more of the additional machine(s) 100a may include a controller, similar to the controller 114 described herein. The description of FIG. 2 herein is in terms of a single additional machine 100a for simplicity, but in practice the worksite system 200 may include multiple additional machines 100a. The supervisory system 210 may be associated with one or more supervisors of the worksite. The supervisory system 210 may be remote (e.g., offboard) from the machine 100 and the additional machine(s) 100a. For example, the supervisory system 210 may include one or more back office devices located at the worksite or located remotely from the worksite. The supervisory system 210 may include a computing device, a server, a virtual server (e.g., executing on computing hardware), or a server in a cloud computing system.

The machine 100 and the additional machine(s) 100a may begin work at the worksite without the use of a map indicating avoidance zones, terrain features, and/or topographical features. As described herein, the map may be generated in real-time, or near real-time, as work performed by the machine 100 and/or the additional machine(s) 100a progresses at the worksite. As shown, the machine 100 includes a control system 150 that includes the controller 114, one or more sensors 122 configured to measure characteristics of the machine 100 and/or characteristics of an environment of the machine 100, and/or one or more perception sensors 124 configured to collect data relating to visual characteristics and/or three-dimensional (3D) characteristics of the worksite. The sensor(s) 122 may include at least one non-perception sensor.

The controller 114 may include one or more memories 116 and one or more processors 118 communicatively coupled to the one or more memories 116. A processor 118 may include a central processing unit, a graphics processing unit, a microprocessor, a controller, a microcontroller, a digital signal processor, a field-programmable gate array, an application-specific integrated circuit, and/or another type of processing component. The processor 118 may be implemented in hardware, firmware, or a combination of hardware and software. The processor 118 may be capable of being programmed to perform one or more operations or processes described elsewhere herein. A memory 116 may include volatile and/or nonvolatile memory. For example, the memory 116 may include random access memory (RAM), read only memory (ROM), a hard disk drive, and/or another type of memory (e.g., a flash memory, a magnetic memory, and/or an optical memory). The memory 116 may be a non-transitory computer-readable medium. The memory 116 may store information, one or more instructions, and/or software (e.g., one or more software applications) related to the operation of the controller 114. The controller 114 may also include a communication component 120 that enables the controller 114 to communicate with other devices (e.g., a device of the additional machine 100a and/or the supervisory system 210) via a wired connection and/or a wireless connection. For example, the communication component 120 may include a receiver, a transmitter, a transceiver, a modem, a network interface card, and/or an antenna. The controller 114 may be configured to perform one or more operations described herein.

A sensor 122 may include a tilt sensor, an accelerometer, a gyroscope, an inertial measurement unit (IMU), a ground-penetrating radar (GPR) sensor, a sonar sensor, an ultrasound sensor, a lidar sensor, a camera, a moisture sensor, a temperature sensor, a torque sensor, and/or a battery level sensor (e.g., a voltage sensor), among other examples. A perception sensor 124 may include a camera, a lidar sensor, a radar sensor, and/or an ultrasound sensor, among other examples. The sensor(s) 122 and the perception sensor(s) 124 may be attached directly or indirectly to the frame. The sensor(s) 122 and the perception sensor(s) 124 may be communicatively coupled with the controller 114 to exchange data with the controller 114.

The controller 114 may monitor sensor data collected by one or more sensors 122 while the machine 100 is operating at the worksite. For example, the sensor data may relate to a tilt angle of the machine 100, acceleration of the machine 100, vibration of the machine 100, a moisture level of the ground surface, a density of the ground surface, a composition of the ground surface, a temperature of one or more components (e.g., an engine) of the machine 100, a torque of an engine of the machine 100, and/or a battery drain rate of the machine 100, among other examples. In some implementations, the sensor data may include image data (e.g., one or more images, or video) and/or point cloud data (e.g., collected by a lidar sensor, an ultrasound sensor, or the like). The sensor data monitored by the controller 114 may have a first (e.g., a baseline) resolution and sampling rate. Moreover, the sensor data monitored by the controller 114 may be collected by at least one non-perception sensor of the sensors 122.

The controller 114 may also obtain location data associated with a location of the machine 100 at the worksite. For example, the controller 114 may obtain the location data from a global navigation satellite system (GNSS) receiver (e.g., a global positioning system (GPS) receiver) of the machine 100. By obtaining the location data, the controller 114 can identify associations between locations of the worksite and the sensor data.

The controller 114 may determine, based on monitoring the sensor data, whether the sensor data is indicative of the machine 100 operating in an unsafe condition at a location (e.g., a current location) of the machine 100. The unsafe condition may relate to a ground surface at the location. For example, the unsafe condition may relate to an interaction between the machine 100 and the ground surface (e.g., indicating how the machine 100 is responding to the ground surface). The unsafe condition may be due to uneven terrain, soft underfooting, excessive grade (e.g., the grade is too steep), muddy conditions, sandy conditions, or the like. For example, in the presence of unsafe conditions, the sensor data may indicate an excessive tilt of the machine 100, a wheel or track slippage of the machine 100, an overheating of the machine 100, and/or an excessive battery drain rate of the machine 100. Additionally, or alternatively, the sensor data may indicate a high moisture level of the ground surface, a low density of the ground surface, and/or a porousness of the ground surface. In some examples, the controller 114 may receive a manual input from an operator of the machine 100 indicating the unsafe condition at the location of the machine 100 (e.g., the controller 114 may determine that the machine 100 is operating in the unsafe condition at the location based on the manual input).

The controller 114 may determine that the sensor data is indicative of the machine 100 operating in the unsafe condition based on the sensor data satisfying one or more criteria. For example, for one or more measurements of the sensor data, the controller 114 may determine whether a measurement satisfies a threshold (e.g., is greater than, equal to, or less than the threshold, depending on a type of the measurement). As an example, the controller 114 may determine whether a tilt angle of the machine 100, indicated in the sensor data, is greater than a threshold (e.g., thereby indicating that the machine 100 is on an excessively steep slope, is in excessively soft underfooting, or the like). A value of a threshold may be different for different types or models of machines. Moreover, a value of a threshold may be based on a current environmental condition at the worksite. For example, a first threshold for a measurement may be used in rainy conditions, or a second threshold for the measurement may be used in non-rainy conditions. The controller 114 may determine the current environmental condition at the worksite using one or more environmental sensors (e.g., a moisture sensor, a temperature sensor, a humidity sensor, or the like).

In an example in which the sensor data includes image data, the controller 114 may determine whether the image data is indicative of the machine 100 operating in an unsafe condition using one or more computer vision techniques. For example, using the computer vision technique(s), the controller 114 may identify one or more characteristics of a terrain of the worksite (e.g., hills, slopes, wet areas, sandy areas, or the like) from the image data, and the controller 114 may determine whether the characteristic(s) are indicative of the machine 100 operating in the unsafe condition. Additionally, or alternatively, the controller 114 may identify whether a perspective depicted in the image data is at an angle (e.g., by analyzing an orientation of typically vertical or horizontal features, such as trees, buildings, a horizon, or the like, in the image data). In an example in which the sensor data includes point cloud data, the controller 114 may identify one or more characteristics of a terrain of the worksite (e.g., hills, slopes, or the like) from the point cloud data (e.g., based on spatial characteristics of the point cloud data), and the controller 114 may determine whether the characteristic(s) are indicative of the machine 100 operating in the unsafe condition.

Based on a determination that the sensor data is indicative of the machine 100 operating in the unsafe condition at the location (e.g., a determination that the sensor data satisfies the one or more criteria), the controller 114 may cause storing of the sensor data relating to the machine 100 operating in the unsafe condition and/or the controller 114 may cause transmission of the sensor data relating to the machine 100 operating in the unsafe condition. The controller 114 may cause storing (e.g., in nonvolatile memory) of the sensor data relating to the machine 100 operating in the unsafe condition at least until the sensor data relating to the machine 100 operating in the unsafe condition is offboarded from the machine 100 (e.g., transmitted or uploaded to a device external from the machine 100, such as the supervisory system 210). The controller 114 may cause transmission of the sensor data relating to the machine 100 operating in the unsafe condition offboard the machine (e.g., to the supervisory system 210 and/or to the additional machine 100a). The sensor data relating to the machine 100 operating in the unsafe condition may include the sensor data that is collected while the sensor data (e.g., one or more measurements thereof) is indicative of the machine 100 operating in the unsafe condition (or a time duration, such as 1 second or 2 seconds, before and after the sensor data being indicative of the machine 100 operating in the unsafe condition).

In some implementations, the sensor data relating to the machine 100 operating in the unsafe condition may include enhanced data (e.g., enhanced data associated with the location of the machine 100). To obtain the enhanced data, the controller 114 may cause the sensors 122 to collect data at a second (e.g., increased) resolution and/or sampling rate. Additionally, or alternatively, to obtain the enhanced data, the controller 114 may cause one or more perception sensors 124 to initiate data collection. Accordingly, the enhanced data may include the sensor data at the second (e.g., increased) resolution and/or sampling rate, and/or the enhanced data may include perception sensor data (e.g., image data and/or point cloud data) collected by the perception sensor(s) 124. The enhanced data facilitates improved analysis (e.g., at the machine 100 or elsewhere) of the unsafe condition and the circumstances of the machine 100 with respect to the unsafe condition.

In some examples, the controller 114 may obtain the enhanced data with increasing enhancement over time. For example, the controller 114 may cause the sensors 122 and/or the perception sensors 124 to collect data at increasing resolution and/or at increasing sampling rate over time. The resolution and/or the sampling rate may be increased in steps at regular time intervals (e.g., every minute, or the like), or the resolution and/or the sampling rate may be increased continuously (e.g., linearly) over time.

In some examples, the controller 114 may store information indicating (e.g., by geographic coordinates, or the like) one or more unsafe locations of the worksite (e.g., avoidance zones, as described below). The controller 114 may monitor the location of the machine 100 to detect when the machine 100 has entered one of the unsafe locations. Based on detecting that the machine 100 has entered one of the unsafe locations, the controller 114 may store and/or transmit the sensor data relating to the machine 100 operating in the unsafe location, as described herein.

The controller 114 may transmit the sensor data relating to the machine 100 operating in the unsafe condition to the supervisory system 210 and/or to the additional machine 100a. The controller 114 may transmit the sensor data relating to the machine 100 operating in the unsafe condition as a stream (e.g., in real-time as the controller 114 obtains the enhanced data). Alternatively, the controller 114 may buffer the sensor data relating to the machine 100 operating in the unsafe condition (e.g., when the machine 100 lacks a network connection), and the controller 114 may transmit the sensor data as a package (e.g., when the machine 100 regains the network connection).

The sensor data relating to the machine 100 operating in the unsafe condition may be processed by the supervisory system 210, or manually reviewed by one or more supervisors associated with the supervisory system 210. For example, the sensor data relating to the machine 100 operating in the unsafe condition may be processed, or manually reviewed, to identify whether an unsafe condition is actually present at the location of the machine 100 and/or to identify a type of the unsafe condition (e.g., uneven terrain, soft underfooting, excessive grade, or the like). Accordingly, the controller 114 may receive, from the supervisory system 210, a notification indicating that the unsafe condition is present at the location of the machine 100 and/or indicating the type of the unsafe condition. The supervisory system 210 may also provide a similar notification to the additional machine 100a.

As another example, the sensor data relating to the machine 100 operating in the unsafe condition may be processed, or manually reviewed, to identify operation instructions (e.g., one or more instructions), based on the sensor data, for controlling the machine 100 at the location. The operation instructions may indicate a path that the machine 100 is to take to navigate through or vacate the unsafe condition, an adjustment to a position of an implement of the machine 100, a speed that the machine 100 is to use, or the like. The controller 114 may receive, from the supervisory system 210, information indicating the operation instructions. The controller 114 may cause presentation of the operation instructions on a display of the machine 100, or otherwise cause an indication of the operation instructions to be provided to an operator of the machine 100, to enable the operator to control the machine 100 in accordance with the operation instructions. Alternatively, the controller 114 may use the operation instructions to provide autonomous control of the machine 100 in accordance with the operation instructions.

In some examples, the sensor data relating to the machine 100 operating in the unsafe condition may be processed, or manually reviewed, for analytical, forensic, or other recordkeeping uses (e.g., to log information relating to the unsafe condition, or relating to machine or human errors resulting in the machine 100 encountering the unsafe condition). In some examples, the controller 114 and/or the supervisory system 210 may generate a topographical map of the worksite based on the sensor data relating to the machine 100 operating in the unsafe condition (e.g., 3D camera data or point cloud data of the enhanced data).

Additionally, or alternatively, the sensor data relating to the machine 100 operating in the unsafe condition may be processed by the additional machine 100a (e.g., by an autonomous control system of the additional machine 100a), or presented on a display of the additional machine 100a for manual review by an operator of the additional machine 100a. The sensor data relating to the machine 100 operating in the unsafe condition may be processed, or manually reviewed, to identify an operating plan that is to be used by the additional machine 100a to avoid the location and/or to safely travel through the location. The machine 100 may receive, from the additional machine 100a, information indicating the operating plan that is to be used by the additional machine 100a.

In some examples, the controller 114 may transmit the sensor data relating to the machine 100 operating in the unsafe condition to the supervisory system 210 and/or to the additional machine 100a accompanied by a support request. The support request may be configured to initiate a communication session between the machine 100 and at least one of the supervisory system 210 or the additional machine 100a (e.g., based on an acceptance of the support request by the supervisory system 210 and/or the additional machine 100a). The communication session may include a voice call and/or a video call. In this way, an operator of the machine 100 may receive guidance for handling the unsafe condition from a supervisor associated with the supervisory system 210 and/or an operator associated with the additional machine 100a (e.g., guidance based on the sensor data relating to the machine 100 operating in the unsafe condition).

In some implementations, the controller 114 may output a notification alerting an operator of the machine 100 of the unsafe condition. For example, the controller 114 may cause presentation of the notification on a display of the machine 100. As another example, the controller 114 may transmit the notification to a user device associated with the operator. Moreover, the controller 114 may transmit, to the additional machine 100a, a notification alerting an operator of the additional machine 100a of the unsafe condition. The controller 114 may output or transmit one or more of the notifications responsive to a determination that the sensor data is indicative of the machine 100 operating in the unsafe condition, and/or responsive to receiving a notification indicating that the unsafe condition is present at the location of the machine 100 (e.g., from the supervisory system 210).

In some implementations, the controller 114 may generate avoidance zone data for a map of the worksite. The controller 114 may determine a location of the avoidance zone based on the sensor data relating to the machine 100 operating in the unsafe condition. The avoidance zone data may indicate the location of the unsafe condition to be avoided, may indicate the type of the unsafe condition, and/or may indicate the sensor data relating to the machine 100 operating in the unsafe condition, among other examples. The controller 114 may generate the avoidance zone data responsive to a determination that the sensor data is indicative of the machine 100 operating in the unsafe condition, and/or responsive to receiving a notification indicating that the unsafe condition is present at the location of the machine 100 (e.g., from the supervisory system 210).

The controller 114 may transmit the avoidance zone data to the supervisory system 210 and/or to the additional machine 100a (e.g., transmitting the avoidance zone data may include transmitting an updated map that indicates the avoidance zone data). In a similar manner, the controller 114 may receive, from the supervisory system 210 and/or from the additional machine 100a, avoidance zone data (e.g., generated by the additional machine 100a) for the map of the worksite (e.g., the controller 114 may receive an updated map indicating the avoidance zone data). The controller 114 may update the map of the worksite with the avoidance zone data (e.g., the controller may update the map with the updated map). In this way, the map of the worksite, indicating avoidance zones, may be constructed in real time as machines operate at the worksite.

In some implementations, the controller 114 may receive, from the additional machine 100*a*, perception sensor data, relating to the machine 100, that is collected by the additional machine 100*a*. For example, the perception sensor data may include image data (e.g., video) and/or lidar data of a scene that includes the machine 100. The additional machine 100*a* may collect the perception sensor data responsive to receiving the sensor data relating to the machine 100 operating in the unsafe condition, responsive to receiving the notification alerting of the unsafe condition, and/or responsive to receiving the avoidance zone data (e.g., as these may indicate that the machine 100 is in need of assistance). Moreover, the sensor data relating to the machine 100 operating in the unsafe condition, the notification, and/or the avoidance zone data may indicate, or may be accompanied by an indication of, the location of the machine 100, thereby enabling the additional machine 100*a* to identify a direction in which to collect the perception sensor data.

The perception sensor data may provide information regarding the machine 100 and/or the surroundings of the machine 100 that otherwise would not be available to the machine 100 using sensors on board the machine 100. The controller 114 may cause presentation of the perception sensor data (e.g., video) on a display of the machine 100 to enable an operator of the machine 100 to better comprehend the unsafe condition encountered by the machine 100. Additionally, or alternatively, the controller 114 may use the perception sensor data to provide autonomous control of the machine 100. In some implementations, the additional machine 100*a* may transmit the perception sensor data to the supervisory system 210, which the supervisory system 210 can use, in combination with the sensor data relating to the machine 100 operating in the unsafe condition, to determine operating instructions for the machine 100, as described above.

In some implementations, the controller 114 may cause the machine 100 to stop (i.e., halt movement) at the location of the machine 100 (e.g., where the unsafe condition is present). Alternatively, the controller 114 may cause the machine 100 to travel to another location of the worksite (e.g., that is not associated with an unsafe condition). For example, the controller 114 may determine that the machine 100 is to stop at the location or travel to another location based on the sensor data relating to the machine 100 operating in the unsafe condition and/or the perception sensor data received from the additional machine 100*a*. As an example, the aforementioned data indicating that the machine 100 is at an extreme tilt angle may indicate that the machine 100 is to stop (as any further movement may cause the machine 100 to lose stability), whereas the data indicating that the machine 100 is at a moderate tilt angle may indicate that the machine 100 is to travel to another location. The controller 114 may cause the machine 100 to stop at the location, or to travel to another location, responsive to a determination that the sensor data is indicative of the machine 100 operating in the unsafe condition, and/or responsive to receiving a notification indicating that the unsafe condition is present at the location of the machine 100 (e.g., from the supervisory system 210). In some examples, the operational instructions received by the controller 114 may indicate that the machine 100 is to stop at the location or to travel to another location, and the controller 114 may cause the machine 100 to stop at the location or to travel to another location in accordance with the operational instructions.

In some implementations, the controller 114 may cause adjustment to a position of an implement of the machine 100 or may cause locking of the position of the implement (e.g., locking the position of the implement may include ignoring operator commands to move the implement). For example, the controller 114 may determine, based on the sensor data relating to the machine 100 operating in the unsafe condition and/or the additional perception sensor data received from the additional machine 100*a*, an adjustment to the position of the implement that provides a center-of-gravity correction for the machine 100. As an example, the controller 114 may cause continuous adjustment to the position of the implement while monitoring the sensor data until one or more measurements of the sensor data satisfy a threshold value (e.g., until a tilt angle measurement for the machine 100 reaches a threshold value). The controller 114 may cause the machine 100 to adjust the position of the implement, or to lock the position of the implement, responsive to a determination that the sensor data is indicative of the machine 100 operating in the unsafe condition, and/or responsive to receiving a notification indicating that the unsafe condition is present at the location of the machine 100 (e.g., from the supervisory system 210). In some examples, the operational instructions received by the controller 114 may indicate an adjustment to the position of the implement or indicate that the position of the implement is to be locked, and the controller 114 may cause adjustment to the position of the implement or cause locking of the position of the implement in accordance with the operational instructions.

In some implementations, the controller 114 may transmit a request for assistance to an assistance machine, such as a tow truck (e.g., which may be the machine 100*a*). The controller 114 may transmit the request responsive to a determination that the sensor data is indicative of the machine 100 operating in the unsafe condition, and/or responsive to receiving a notification indicating that the unsafe condition is present at the location of the machine 100 (e.g., from the supervisory system 210). As an example, the controller 114 may transmit the request responsive to the controller 114 causing the machine 100 to stop at the location of the machine 100.

One or more types of information described herein as being transmitted by the controller 114 may additionally, or alternatively, be received by the controller 114 from the supervisory system 210 and/or the additional machine 100*a*. Similarly, one or more types of information described herein as being received by the controller 114 may additionally, or alternatively, be transmitted by the controller 114 to the supervisory system 210 and/or the additional machine 100*a*. Furthermore, one or more types of information described herein as being transmitted by the controller 114 to the additional machine 100*a*, or received by the controller 114 from the additional machine 100*a*, may instead be communicated between the controller 114 and the additional machine 100*a* via the supervisory system 210. Here, the supervisory system 210 may merely forward or relay the information, or the supervisory system 210 may process, reformat, and/or alter the information and provide a communication that is based on the information.

As indicated above, FIG. 2 is provided as an example. Other examples may differ from what is described in connection with FIG. 2.

Figure 3:
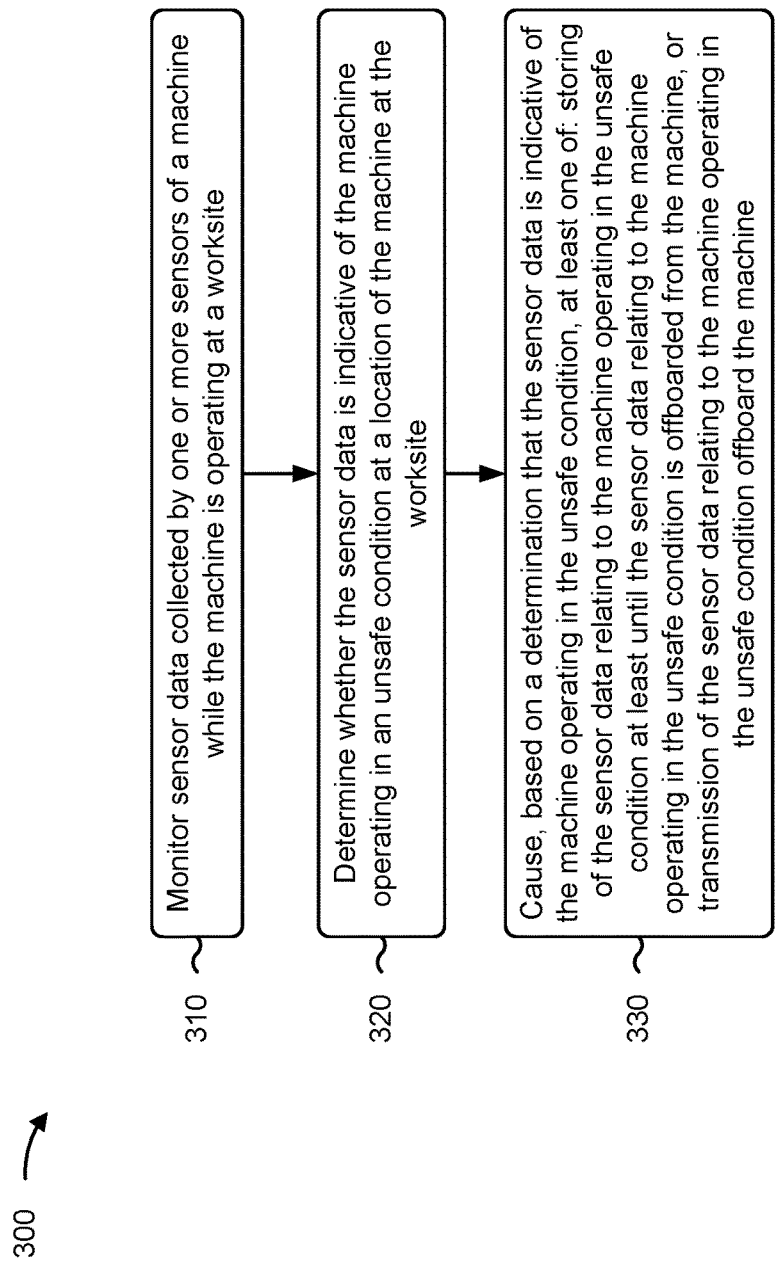
FIG. 3 is a flowchart of an example process associated with worksite condition assessment using sensors of a work machine.

FIG. 3 is a flowchart of an example process 300 associated with worksite condition assessment using sensors of a work machine. One or more process blocks of FIG. 3 may be performed by a controller (e.g., controller 114). Additionally, or alternatively, one or more process blocks of FIG.

3 may be performed by another device or a group of devices separate from or including the controller, such as another device or component that is internal or external to the machine 100, such as the supervisory system 210.

As shown in FIG. 3, process 300 may include monitoring sensor data collected by one or more sensors of a machine while the machine is operating at a worksite (block 310). For example, the controller may monitor sensor data collected by one or more sensors of a machine while the machine is operating at a worksite, as described above.

As further shown in FIG. 3, process 300 may include determining whether the sensor data is indicative of the machine operating in an unsafe condition at a location of the machine at the worksite (block 320). For example, the controller may determine whether the sensor data is indicative of the machine operating in an unsafe condition at a location of the machine at the worksite, as described above. Determining whether the sensor data is indicative of the machine operating in the unsafe condition may include determining that the sensor data is indicative of the machine operating in the unsafe condition based on a measurement of the sensor data satisfying a threshold.

As further shown in FIG. 3, process 300 may include causing, based on a determination that the sensor data is indicative of the machine operating in the unsafe condition, at least one of: storing of the sensor data relating to the machine operating in the unsafe condition at least until the sensor data relating to the machine operating in the unsafe condition is offboarded from the machine, or transmission of the sensor data relating to the machine operating in the unsafe condition offboard the machine (block 330). For example, the controller may cause, based on a determination that the sensor data is indicative of the machine operating in the unsafe condition, at least one of storing or transmission of the sensor data relating to the machine operating in the unsafe condition, as described above.

The sensor data may be monitored at a first resolution or sampling rate, and process 300 may include obtaining, based on the determination that the sensor data is indicative of the machine operating in the unsafe condition, the sensor data at a second resolution or sampling rate. Additionally, or alternatively, the sensor data that is monitored may be collected by at least one non-perception sensor of the one or more sensors, and process 300 may include obtaining, based on the sensor data being indicative of the machine operating in the unsafe condition, perception sensor data collected by one or more perception sensors of the machine. Process 300 may include receiving, from a remote supervisory system, information indicating operation instructions for controlling the machine at the location. Process 300 may include receiving, from an additional machine, perception sensor data collected by the additional machine and relating to the machine, and causing presentation of information relating to the perception sensor data on a display of the machine.

Process 300 may include causing the machine to stop at the location. Process 300 may include generating avoidance zone data for a map of the worksite, and transmitting the avoidance zone data to the remote supervisory system or to the additional machine. Process 300 may include receiving, from the remote supervisory system or the additional machine, avoidance zone data for a map of the worksite, and updating the map of the worksite with the avoidance zone data.

Process 300 may include outputting a notification alerting an operator of the machine of the unsafe condition. Process 300 may include transmitting a notification alerting an operator of an additional machine operating at the worksite of the unsafe condition.

Although FIG. 3 shows example blocks of process 300, in some implementations, process 300 may include additional blocks, fewer blocks, different blocks, or differently arranged blocks than those depicted in FIG. 3. Additionally, or alternatively, two or more of the blocks of process 300 may be performed in parallel.

INDUSTRIAL APPLICABILITY

The control system described herein may be used with any machine that performs work operations at a worksite. For example, the control system may be used with a work machine (e.g., a soil compactor) that performs operations at a worksite associated with base layer preparation, including shaping, grading, and/or compacting a base layer (e.g., a soil layer). A worksite may include a variety of terrain having various elevational changes, slopes, and types of ground, which can change over time as work progresses at the worksite. Due to the variable properties of the terrain, some areas of the worksite may be in a condition that is unsafe, or presents safety challenges, for machine operation.

The control system described herein is useful for identifying unsafe conditions at a worksite, such as uneven terrain, soft underfooting, excessive grade, and/or muddy areas. In particular, the control system may monitor sensor data collected by sensors of the work machine to detect when measurements of the sensor data are indicative of the work machine operating in an unsafe condition. Based on detecting that the work machine is operating in the unsafe condition, the control system may store the sensor data relating to the machine operating in the unsafe condition, at least until the sensor data can be offboarded from the work machine, and/or may transmit the sensor data relating to the machine operating in the unsafe condition offboard the machine. Moreover, the sensor data relating to the machine operating in the unsafe condition may include enhanced data, which may include perception sensor data (e.g., image data, lidar data, or the like) and/or may include the sensor data at an increased resolution and/or sampling rate. The sensor data relating to the work machine operating in the unsafe condition facilitates analysis (e.g., by the control system or another system in communication with the control system) of the unsafe condition and the circumstances of the machine 100 with respect to the unsafe condition. In this way, the control system enables real-time monitoring of unsafe conditions at the worksite to provide adaptability to changing terrain as work progresses at the worksite.

Furthermore, the sensor data relating to the work machine operating in the unsafe condition may facilitate determination of an appropriate action to be taken by the work machine in order to handle the unsafe condition. For example, the control system may cause the work machine to alert an operator of the work machine, to stop in place, to navigate through the unsafe condition, to correct a center of gravity of the work machine, or the like. These actions may avert tipping of the work machine, or other outcomes that could damage the work machine. Accordingly, the control system may reduce damage and/or wear to the work machine, and extend a useful life of the work machine.

The foregoing disclosure provides illustration and description, but is not intended to be exhaustive or to limit the implementations to the precise forms disclosed. Modifications and variations may be made in light of the above disclosure or may be acquired from practice of the implementations. Furthermore, any of the implementations described herein may be combined unless the foregoing disclosure expressly provides a reason that one or more implementations cannot be combined. Even though particular combinations of features are recited in the claims and/or disclosed in the specification, these combinations are not intended to limit the disclosure of various implementations. Although each dependent claim listed below may directly depend on only one claim, the disclosure of various implementations includes each dependent claim in combination with every other claim in the claim set.

When "a processor" or "one or more processors" (or another device or component, such as "a controller" or "one or more controllers") is described or claimed (within a single claim or across multiple claims) as performing multiple operations or being configured to perform multiple operations, this language is intended to broadly cover a variety of processor architectures and environments. For example, unless explicitly claimed otherwise (e.g., via the use of "first processor" and "second processor" or other language that differentiates processors in the claims), this language is intended to cover a single processor performing or being configured to perform all of the operations, a group of processors collectively performing or being configured to perform all of the operations, a first processor performing or being configured to perform a first operation and a second processor performing or being configured to perform a second operation, or any combination of processors performing or being configured to perform the operations. For example, when a claim has the form "one or more processors configured to: perform X; perform Y; and perform Z," that claim should be interpreted to mean "one or more processors configured to perform X; one or more (possibly different) processors configured to perform Y; and one or more (also possibly different) processors configured to perform Z."

As used herein, "a," "an," and a "set" are intended to include one or more items, and may be used interchangeably with "one or more." Further, as used herein, the article "the" is intended to include one or more items referenced in connection with the article "the" and may be used interchangeably with "the one or more." Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A control system for a machine, comprising:
a plurality of sensors comprising one or more non-perception sensors and one or more perception sensors; and
a controller, communicatively coupled with the plurality of sensors, configured to:
monitor, while the machine is operating at a worksite, first sensor data collected by the one or more non-perception sensors at a first resolution or sampling rate;
determine whether the first sensor data is indicative of the machine operating in an unsafe condition at a location of the machine at the worksite;
cause, based on a determination that the first sensor data is indicative of the machine operating in the unsafe condition, the one or more perception sensors to initiate data collection and the one or more non-perception sensors to collect data at a second resolution or sampling rate;
obtain second sensor data collected by the one or more perception sensors and collected by the one or more non-perception sensors at the second resolution or sampling rate;
receive, from an additional machine operating at the worksite and based on the determination that the first sensor data is indicative of the machine operating in the unsafe condition, perception sensor data collected by the additional machine and relating to the machine; and
cause, based on the second sensor data and the perception sensor data, the machine to stop at the location of the machine or to travel to another location of the worksite.

2. The control system of claim 1, wherein the controller is further configured to:
receive, from a remote supervisory system, information indicating operation instructions for controlling the machine at the location,
wherein the operation instructions are based on at least one of the first sensor data or the second sensor data.

3. The control system of claim 1, wherein the controller, to determine whether the first sensor data is indicative of the machine operating in the unsafe condition, is configured to:
determine that the first sensor data is indicative of the machine operating in the unsafe condition based on a measurement of the sensor data satisfying a threshold.

4. The control system of claim 1, wherein the controller, to cause the machine to stop at the location of the machine or to travel to another location of the worksite, is configured to: cause the machine to stop at the location.

5. The control system of claim 1, wherein the controller is further configured to:
output a notification alerting an operator of the machine of the unsafe condition.

6. The control system of claim 1, wherein the controller is further configured to:
transmit a notification alerting an operator of the additional machine operating at the worksite of the unsafe condition.

7. The control system of claim 1, wherein the one or more perception sensors comprise at least one of a camera, a lidar sensor, a radar sensor, or an ultrasound sensor.

8. A method, comprising:
monitoring, by a controller and while a machine is operating at a worksite, first sensor data collected by one or more non-perception sensors of the machine at a first resolution or sampling rate;
determining, by the controller, whether the first sensor data is indicative of the machine operating in an unsafe condition at a location of the machine at the worksite;
causing, by the controller, based on a determination that the first sensor data is indicative of the machine operating in the unsafe condition, one or more perception sensors to initiate data collection and the one or more non-perception sensors to collect data at a second resolution or sampling rate;
obtaining second sensor data collected by the one or more perception sensors and collected by the one or more non-perception sensors at the second resolution or sampling rate;
receiving, from an additional machine operating at the worksite and based on the determination that the first sensor data is indicative of the machine operating in the unsafe condition, perception sensor data collected by the additional machine and relating to the machine; and causing, based on the second sensor data and the perception sensor data, the machine to stop at the location of the machine or to travel to another location of the worksite.

9. The method of claim 8, further comprising:
receiving, from a remote supervisory system, information indicating operation instructions for controlling the machine at the location,
wherein the operation instructions are based on at least one of the first sensor data or the second sensor data.

10. The method of claim 8, further comprising:
causing presentation of the perception sensor data on a display of the machine.

11. The method of claim 8, wherein causing the machine to stop at the location of the machine or to travel to another location of the worksite comprises:
causing the machine to stop at the location.

12. The method of claim 8, further comprising:
generating, based on the determination that the first sensor data is indicative of the machine operating in the unsafe condition, avoidance zone data for a map of the worksite; and
transmitting the avoidance zone data to a remote supervisory system or to the additional machine.

13. The method of claim 8, further comprising:
receiving, from a remote supervisory system or the additional machine operating at the worksite, avoidance zone data for a map of the worksite; and
updating the map of the worksite with the avoidance zone data.

14. The method of claim 8, further comprising:
outputting a notification alerting an operator of the machine of the unsafe condition.

15. A machine, comprising:
a frame;
one or more ground-engaging members supporting the frame; and
a controller supported by the frame, the controller configured to:
monitor, while the machine is operating at a worksite, first sensor data collected by one or more non-perception sensors of the machine at a first resolution or sampling rate;
cause, based on the first sensor data being indicative of the machine operating in an unsafe condition at a location of the machine at the worksite, one or more perception sensors to initiate data collection and the one or more non-perception sensors to collect data at a second resolution or sampling rate;
obtain second sensor data collected by the one or more perception sensors and collected by the one or more non-perception sensors at the second resolution or sampling rate;
receive, from an additional machine operating at the worksite and based on the first sensor data being indicative of the machine operating in the unsafe condition at the location of the machine at the worksite, perception sensor data collected by the additional machine and relating to the machine; and
cause, based on the second sensor data and the perception sensor data, the machine to stop at the location of the machine or to travel to another location of the worksite.

16. The machine of claim 15, wherein the controller is further configured to transmit the first sensor data relating to the machine operating in the unsafe condition to a remote supervisory system or to the additional machine.

17. The machine of claim 15, wherein the first sensor data relates to a tilt angle of the machine.

18. The machine of claim 15, wherein the unsafe condition relates to a ground surface at the location.

19. The machine of claim 15, wherein the machine is a soil compactor machine.

20. The machine of claim 15, wherein the one or more perception sensors comprise at least one of a camera, a lidar sensor, a radar sensor, or an ultrasound sensor.

* * * * *